US 9,169,401 B2

(12) United States Patent
Susekov et al.

(10) Patent No.: US 9,169,401 B2
(45) Date of Patent: Oct. 27, 2015

(54) METHOD OF PRODUCTION OF SOOT FROM RUBBER WASTE

(71) Applicants: Zakrytoe Aktsionernoe Obschestvo "Nauchno-Proizvodstvennoe Ob'edinenie Innovatekh", St. Petersburg (RU); Evgeny S. Susekov, St. Petersburg (RU); Alexei S. Gradov, St. Petersburg (RU)

(72) Inventors: Evgeny S. Susekov, St. Petersburg (RU); Alexei S. Gradov, St. Petersburg (RU)

(73) Assignees: Zakrytoe Aktsionernoe Obschestvo "Nauchno-Proizvodstvennoe Ob'edinenie Innovatekh", St. Petersburg (RU); Evgeny S. Susekov, St. Petersburg (RU); Alexei S. Gradov, St. Petersburg (RU)

( * ) Notice: Subject to any disclaimer, the term of this patent is extended or adjusted under 35 U.S.C. 154(b) by 0 days.

(21) Appl. No.: 14/302,989

(22) Filed: Jun. 12, 2014

(65) Prior Publication Data

US 2014/0294716 A1    Oct. 2, 2014

Related U.S. Application Data

(63) Continuation of application No. PCT/RU2012/000960, filed on Nov. 20, 2012.

(30) Foreign Application Priority Data

Dec. 13, 2011    (RU) ................ 2011150813

(51) Int. Cl.
*C09C 1/48* (2006.01)
*C08J 11/12* (2006.01)
(Continued)

(52) U.S. Cl.
CPC ................ *C09C 1/482* (2013.01); *C08J 11/12* (2013.01); *C09C 1/48* (2013.01); *C10B 47/44* (2013.01); *C10B 53/07* (2013.01); *C10G 1/10* (2013.01)

(58) Field of Classification Search
CPC .... C09C 1/00; C09C 1/44–1/54; C08J 11/00; C08J 11/12; C08J 11/14; C08J 11/16; C08J 11/20; C01B 51/00; C01B 51/64; C01B 51/55; F23G 5/00
See application file for complete search history.

(56) References Cited

U.S. PATENT DOCUMENTS 5,728,361 A * 3/1998 Holley ................ 423/449.6
2010/0133085 A1   6/2010 Hutchins

FOREIGN PATENT DOCUMENTS

RU    2153415 C2    7/2000
RU    2211144 C2    8/2003
(Continued)

OTHER PUBLICATIONS

International Search Report from International Application No. PCT/RU2012/000960, filed Nov. 20, 2012, mailed Apr. 25, 2013.
(Continued)

*Primary Examiner* — Richard M Rump
(74) *Attorney, Agent, or Firm* — Patentbar International, P.C.

(57) ABSTRACT

Scrap rubber is decomposed in a reactor. The decomposition products are separated into gaseous products and carbon residue. The gaseous products are heated to 1200-1300° C. to decomposition primarily resins and asphaltenes, oil is isolated, atomized to a droplet size of 0.2-2.0 mm, mixed in a ratio of 1:(0.05-3.0) with the carbon residue, which is ground to 0.1-1.0 mm, and thermally decomposed into carbon black with an atomic hydrogen-to-carbon ratio (H:C) in the range of 0.02-0.07 and gases. Ash and volatile compounds are removed from the carbon residue. Carbon black is separated from the ash. The heat given off during combustion of part of the oil is spent on the formation of carbon black, the flash heating of the carbon residue and the removal of volatile substances therefrom, said volatile substances being subjected to intensive heating in the absence of oxygen using heated carbon black particles and oil combustion products.

1 Claim, 1 Drawing Sheet

(51) Int. Cl.
*C10B 47/44* (2006.01)
*C10B 53/07* (2006.01)
*C10G 1/10* (2006.01)

(56) References Cited

FOREIGN PATENT DOCUMENTS

| RU | 2269415 | C2 | 2/2006 |
| RU | 2276170 | C2 | 5/2006 |
| RU | 2408819 | C1 | 1/2011 |
| SU | 747868 | | 7/1980 |

OTHER PUBLICATIONS

Zuyev, V. P., Mikhailov, V. V., Soot Production, M.: Khimiya, 1965, pp. 33-37.

Syunyaev, Z. I., Petroleum Carbon, M.: Khimiya, 1980, p. 21.

* cited by examiner

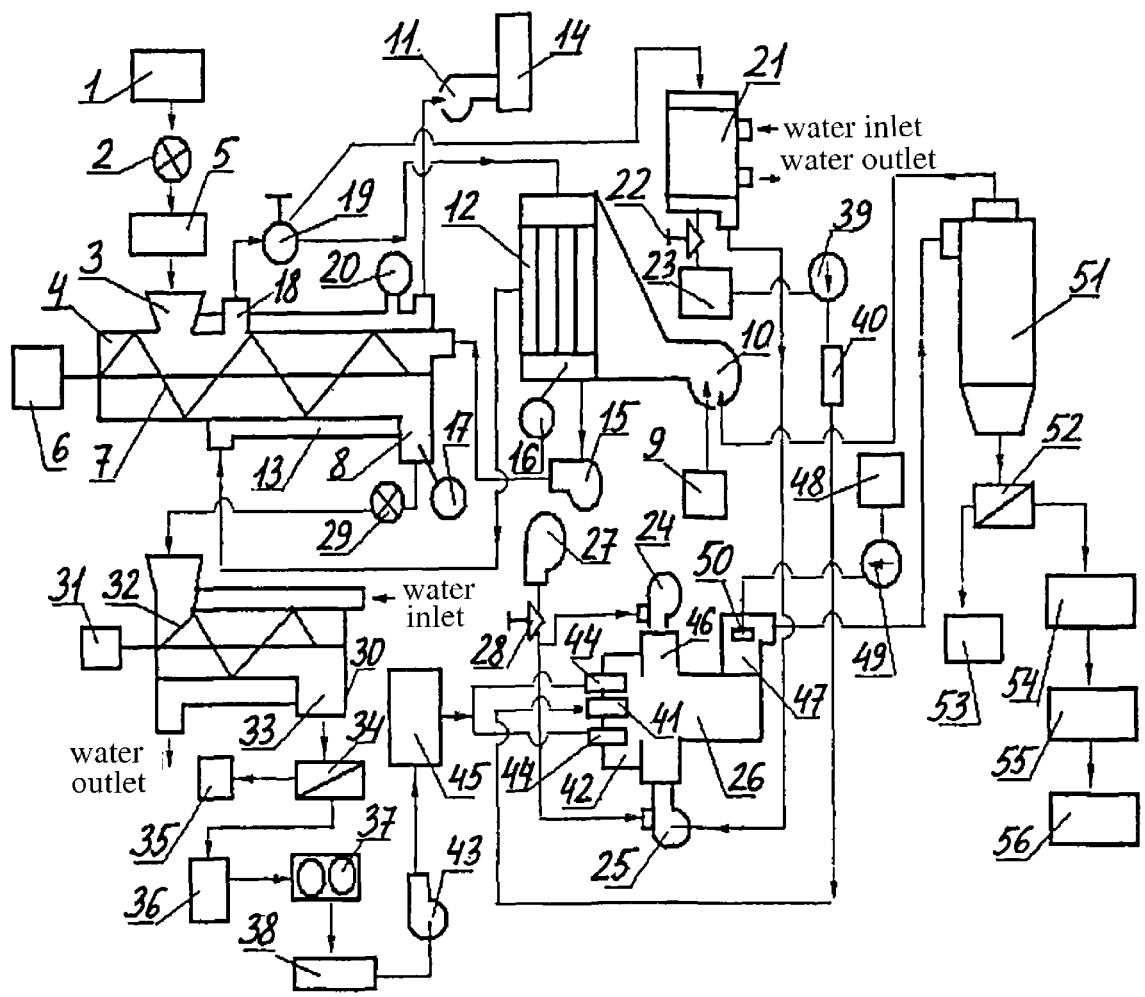

METHOD OF PRODUCTION OF SOOT FROM RUBBER WASTE

RELATED APPLICATIONS

This Application is a Continuation application of International Application PCT/RU2012/000960, filed on Nov. 20, 2012, which in turn claims priority to Russian Patent Applications No. RU 2011150813, filed Dec. 13, 2011, both of which are incorporated herein by reference in their entirety.

FIELD OF THE INVENTION

The invention relates to organic waste processing technologies and may be used in the chemical industry for production of soot from alternative waste material (waste rubber components), and in the rubber industry for production of rubber blend components.

BACKGROUND OF THE INVENTION

There is a known method of recycling of waste tires and rubber components, in which the raw material is thermally treated being placed into an extractor filled with oil products at a temperature of 260-290° C., rubber is completely dissolved, after which the obtained rubber modified bitumen is drained, and the residue of soot and mineral components and metal cord are washed with gasoline solvent, which is then steamed away; after that, the solid residue is crushed and metal cord and soot are extracted from it (see RF Patent No. 2153415, publ. БИ 2000, No. 17).

A disadvantage of the said method is high energy consumption determined both by the need to heat an extractor with waste and oil products to a temperature of 260-290° C. and by the use of steam, the generation of which requires energy consumption.

Material disadvantages of the said method are the need to wash the remainder of soot and metal cord with gasoline solvent, which then has to be regenerated, and low quality of the soot produced containing a large (up to 15% wt) quantity of ashes as mineral components, which requires additional separation of soot from ash components to improve its quality performances.

There is a known method of soot production from polymer compounds including pyrolysis of solid carbon-containing raw materials, waste polymer compounds, at 400-1500° C. forming a solid carbon residue and releasing vapor-and-gas products, and subsequent crushing of the carbon residue in the vapor-and-gas product flow at 350-500° C.

The waste pyrolysis is carried out in a vapor-and-gas environment, which is a vapor-and-gas mixture containing, % vol:

|  |  |
|---|---|
| Superheated steam | 35-50 |
| Carbon dioxide | 5-10 |
| Carbon monoxide | 1-3 |
| Oxygen | 0.1-2.0 |
| Nitrogen |  |
| Other |  |

The vapor-and-gas products are subjected to thermal decomposition at 1400-1500° C. (USSR Cert. of Authorship No. 747868, publ. БИ 1980, No. 26).

Among the disadvantages of the said method is high energy consumption determined by the high temperature of the pyrolysis process reaching 1500° C., emissions of gaseous pollutants to the environment during the thermal decomposition of vapor-and-gas products, and low quality of the soot produced due to impurities in the form of ashes.

There is a known method of thermal processing of waste tires and a plant for its embodiment ensuring production of a solid carbon residue (soot) with the following performances: iodine number (ml/100 g)=112; light transmission of toluene extract (%)=98; dibutyl phthalate adsorption (ml/100 g)=93; reusable. In this method, pyrolysis of waste tires is carried out in a reactor at 550-800° C., in the environment of a reduction gas obtained in the reduction gas generator by burning hydrocarbon-containing gases, and the pyrolysis products are separated. At least some of the gaseous pyrolysis products leaving the reactor with liquid hydrocarbon vapors are fed to the reduction gas generator and thermal unit. At least some of the flue gases leaving the thermal unit are fed to the reduction gas generator and the reactor (see RF Patent No. 2269415 publ. БИ 2006, No. 5).

The disadvantages of this method are high energy consumption for processing determined by the need to obtain reduction gas by incomplete combustion of hydrocarbons, high emissions of toxic compounds into the environment, and complex implementation of the process.

The closest to the claimed invention is the method of soot production from rubber waste (see RF Patent No. 2276170, publ. БИ 2006, No. 13) that we adopted as the prototype.

The method includes thermal decomposition of the said waste in a vapor-and-gas environment, division of decomposition products into vapor-and-gas products and solid carbon residue, and carbon residue crushing.

Oil is released from the vapor-and-gas products by condensation, to be thermally decomposed into soot and gases at 900-2000° C., while the vapor-and-gas products after the oil removal are burnt together with the crushed carbon residue, and soot is released from the combustion products by filtering.

After the release of oil together with crushed carbon residue, the vapor and gas products are burnt at the air excess factor of 0.4-0.9.

Prior to crushing, metal is released from the carbon residue by magnetic separation.

Oil thermal decomposition gases are burnt, and the combustion products are used as heat transfer agent for external heating of the reactor.

Among the disadvantages of this method are high specific energy consumption for production of 1 kg of soot, since a large part of the carbon residue is burnt without soot generation together with vapor-and-gas products, and high emissions of polluting combustion products into the environment, due to large quantities of substances to be burnt: gases of thermal decomposition of oil, vapor-and-gas products, and some of the crushed carbon residue.

Another disadvantage of such method is a low quality of the soot obtained, since with a part of crushed carbon residue burnt away, the carbon content in the generated soot decreases, and the ash content increases.

SUMMARY OF THE INVENTION

The purpose of the claimed invention is a reduction of energy costs of soot production, and reduction of polluting emissions to the environment, and improved quality of soot produced from rubber waste.

The object is achieved by that, prior to oil release, the gaseous products are thermally treated by heating them to 1200-1300° C., thus performing thermal decomposition of high molecular weight compounds, mainly resins and asphaltenes whose molecular weight varies between 500 and 1500, where heating the gaseous products below 1200° C. leads to a severe decrease of the rate of thermal decomposition of high molecular weight compounds, so that an extended exposure of the gaseous products to such temperature is needed to ensure complete decomposition of high molecular weight compounds, which eventually leads to a drastic increase of energy costs of the soot production process, while heating the gaseous products to a temperature above 1300° C. leads to a drastic increase in generated non-condensable gases and thus to a lower amount of oil released from gaseous products, drastic increase of combustion products that are emitted into the environment and pollute the air; thermal decomposition of high molecular weight compounds restricts the boiling range of oil produced from gaseous products to 340-400° C. with a molecular weight of 200-300 and decreases its coking capacity making it a high-quality liquid raw material for soot production, for the practice has shown that the coking of raw materials for furnace black production shall not exceed 1.5%; thermal pre-treatment of the gaseous products, i.e. prior to oil release they are enriched with flammable gases generated in the decomposition of high molecular weight compounds, the specific heat of the gaseous products after oil release is increased, which enables their burning to ensure thermal decomposition of oil and carbon residue; prior to thermal decomposition, oil is atomized to a drop size of 0.2-2.0 mm, and then mixed with carbon residue crushed to a particle size of 0.1-1.0 mm at the ratio of 1:(0.05-3.0), thus preventing soot from burning out of the carbon residue; the obtained mixture is subjected to thermal decomposition into soot and gases, where oil atomization to particle sizes of less than 0.2 mm entails higher energy consumption for the atomization process and leads to a drastic growth of the specific surface of such disperse system or aerosol, so that such drops will rapidly evaporate in the thermal decomposition—for the supply of such particles to a gaseous environment heated to a high temperature is followed by their fast evaporation, so that the carbon residue particles that were on the surface of oil drops will burn intensely, i.e. soot will burn out reducing the soot output and thus increasing the energy consumption of the process of soot production from rubber waste; while oil atomization to particles of over 2 mm and the supply of such mixture, i.e. oil drops and carbon residue particles, to the soot production reactor will result in sedimentation of drops onto the soot production reactor's walls and their coking, thus disturbing the soot production process; to prepare a mixture of oil drops and carbon residue particles where carbon residue particles are on the surface of oil drops or inside them, carbon residue crushed to particle sizes of 0.1-1.0 mm is used, the carbon residue crushing to sizes less than 0.1 mm entailing a significant growth of the energy costs of the crushing process and the said particles of less than 0.1 mm intensely forming aggregations that have to be broken prior to mixing the carbon residue with the atomized oil, while the use of a carbon residue with the particle size exceeding 1.0 mm will prevent forming a mixture where residue particles are on the surface of oil drops or inside the said drops, and in this case soot will intensely burn out of carbon residue particles since oil evaporation diminishes the drops, so that the carbon residue particles start to burn out, i.e. the soot burns away; mixing oil drops with carbon residue particles at a weight ratio of less than 0.05 kg of residue per 1 kg of oil=less than 1:0.05 and thermal decomposition of such mixture will not increase the soot output, and will not ensure a uniform mixture; due to its small quantity, the carbon residue is not uniformly spread over the mixture volume, which may disturb the soot production process; mixing oil drops with carbon residue particles at a weight ratio of over 3 kg of residue per 1 kg of oil will result in the carbon residue intensely absorbing oil as oil will be soaked up by carbon particles, so that no oil film covering the residue particles will be formed, and carbon will burn out, and the soot output will decrease severely; thermal decomposition of oil is performed together with the carbon residue enabling simultaneous production of soot and heat-up and calcination of the carbon residue, removal of residual volatile products in the amount of 10-20% wt from it, burn-off of sulfur compounds, breaking of aggregations of ash and carbon particles, crushing of carbon residue particles, enrichment of the carbon residue with carbon, reduction of the hydrogen content and establishing the hydrogen-to-carbon atomic ratio (H/C) required by the quality soot performances within 0.02-0.07, otherwise at higher values of the H/C atomic ratio, within 0.2-0.6, the carbon residue will be not soot but coke; to obtain soot from the carbon residue, i.e. its regeneration, all impurities such as ashes and volatile compounds are removed from the said residue, enrichment of the carbon residue, ash removal achieved by calcination, so that because of thermal stresses occurring in aggregations of soot and ash particles, due to different cubic expansions of soot particles and ash particles, the soot particles are split from ash particles, and after the ash removal, the carbon and ash particles are separated, i.e. soot is released from the carbon residue by the methods of electromagnetic separation, or mechanical separation, or filtering; the soot and ash particles are separated, i.e. soot is released from the carbon residue; in the thermal decomposition of oil together with the carbon residue the heat released in the combustion of a part of oil is used not only for soot generation but also for fast heating of carbon residue particles, removal of residual volatile products from it, and generation of thermal stresses in the said carbon residue particles, the residual volatile products are intensely heated without oxygen by heated soot particles and oil combustion products, leading to thermal decomposition of volatile products producing gases and soot; the gaseous products are burnt after the oil release, and the obtained thermal energy is used to support thermal decomposition of oil and carbon residue, the gases of thermal decomposition of oil and carbon residue are burnt, and the thermal energy obtained is used to support gaseous product thermal processing, where the heat amount required for thermal decomposition of waste tires is calculated from the relationship:

$$Q\text{tot} = Q\text{heat} + Q\text{dec} + Q\text{loss},$$

$$Q\text{tot} = 1.2\{(Av \text{ waste } Mw(T2-T1) + qMw)\},$$

where $Q\text{tot}$=total heat quantity required for thermal decomposition of the waste; $Q\text{heat}$=heat of waste heating up to the temperature of 400° C.; $Q\text{dec}$=heat consumed for waste decomposition; $Q\text{loss}$=heat losses making 20% of the total heat; $q$=specific heat of decomposition making 600 kJ/kg for rubber waste; $Mw$=weight of the waste, kg; $T1=20°$ C. and $T2=400°$ C.=initial and final waste temperature; $Av$ waste=specific heat of the waste equal to 1.4 kJ/kg° C., which confirms the compliance of the claimed invention with the "novelty" criterion.

The prior thermal treatment of gaseous products prior to oil release enables thermal decomposition of high molecular weight compounds (mainly resins and asphaltenes whose molecular weight varies between 500 and 1500), which eventually reduces the boiling interval of oil produced from gaseous products and reduction of its coking, i.e. oil performances are provided meeting the requirements set for high-quality liquid raw material for soot production.

As is well-known (see Zuyev, V. P., Mikhailov, V. V. Soot Production, M.: Khimiya, 1965, pp. 33-37), to obtain homogeneous soot, the raw materials used must be a fraction boiling away within as narrow limits as possible.

Therefore, the best raw material should be understood as having the boiling point of 340° C. and the end boiling point of 400° C. The boiling point temperature of the raw material may be assumed not lower than 220° C. without material impairment of process performances. Such raw material has a molecular weight of 200-300.

The content of resinous substances and asphaltenes in the raw material must be minimum. The experience of soot production facilities has shown that the coking of raw materials for furnace black production must not exceed 1.5%.

Thermal treatment of gaseous products prior to oil release enables enrichment of these products with flammable gases generated in the decomposition of high molecular weight compounds, which increases the specific heat of the gaseous products after oil release and enables their burning to support the thermal decomposition of oil and carbon residue.

Heating the gaseous products below 1200° C. results in a severe reduction of the rate of thermal decomposition of high molecular weight compounds, therefore an extended exposure of the gaseous products to such temperatures is needed to ensure complete decomposition of high molecular weight compounds, which finally results in a drastic increase of energy consumption for the soot production process. Heating the gaseous products to a temperature above 1300° C. results in a drastic increase in the quantity of generated non-condensable gases and thus in a reduction of the quantity of oil released from gaseous products. Besides, the non-condensable gases of thermal decomposition of the gaseous products have to be burnt to prevent their emission to the environment, which leads to a drastic increase of combustion products emitted to the environment and polluting the air.

The thermal decomposition of oil together with carbon residue enables, along with soot production (generated in the thermal decomposition of oil), heat-up and calcination of the carbon residue. As a result of the heat-up and calcination of the carbon residue, the residual volatile products are removed from it (remaining after rubber waste thermal decomposition in the amount of up to 10-20% wt), sulfur compounds burn off, aggregations of ash and carbon residue particles are broken, and carbon residue particles are crushed. Due to these effects, the carbon residue is enriched with carbon and the hydrogen content decreases, i.e. a hydrogen-to-carbon atomic ratio (H/C) required by the quality soot performances is established. Otherwise (at higher values of the H/C atomic ratio) the carbon residue will be not soot but coke. It is known (see Syunyaev, Z. I. Petroleum Carbon. M.: Khimiya, 1980, p. 21) that the hydrogen-to-carbon atomic ratio in quality soots must vary within 0.02-0.07, and in cokes this ratio is within H/C=0.2-0.6.

Since the soot used in rubber manufacturing does not change its structure in rubber waste thermal decomposition (i.e. remains soot), for soot production from the carbon residue (its regeneration) all impurities (ash and volatile compounds) have to be removed from the residue. However, during the thermal decomposition of rubber, the particles form aggregations with soot particles, i.e. the carbon particles become coupled with ash particles. Thus, for carbon residue enrichment (ash removal), these aggregations have to be broken, after which by special methods (electromagnetic separation, mechanical separation, or flotation) the ash particles and soot particles can be separated, i.e. soot can be released from the carbon residue.

In the calcination of the carbon residue, due to the occurring thermal stresses in aggregations (caused by different cubic expansions of soot particles and ash particles), soot particles are separated from ash particles, which enables soot release from the carbon residue at a later stage.

When soot is produced from oil, part of the said oil is burnt, and the remainder forms soot in the form of particles heated to a high temperature. Thus, in the thermal decomposition of oil together with the carbon residue, the heat released in the combustion of a part of oil is spent not only for soot generation but also for heating of carbon residue particles. Such heated (glowed) to a high temperature (1100° C. and higher) soot particles obtained from oil contact (touch) the carbon residue particles so that the said particles are rapidly heating; as a result, residual volatile products are removed from the residue and thermal stresses occur in the carbon residue particles. The residual volatile products removed from the carbon residue are subjected to intense heating (without oxygen) as a result of heat exchange with heated soot particles and oil combustion products, which leads to thermal decomposition of the volatile products producing gases and soot. Thus the soot output increases in joint thermal decomposition of oil with the carbon residue due to additional soot generation from residual volatile products.

Oil atomization prior to thermal decomposition and its mixing with crushed carbon residue prevents soot from burning out of the carbon residue (the soot that was used in the rubber manufacturing and is contained in the carbon residue), which improves the soot output from the rubber waste and eventually reduces the energy consumption of the entire process of soot production from waste.

The effect of prevention of soot from burning out of the carbon residue is achieved because carbon residue particles when mixing with oil drops are sedimented on the said particles (oil drops entrap carbon residue particles). In the thermal decomposition of such mixture into soot and gases by its incomplete combustion, the oil vapors generated by oil drop heating are burnt first of all, while the carbon residue particles, i.e. soot, virtually do not burn.

Oil atomization to particle sizes of less than 0.2 mm entails higher energy consumption for the atomization process and leads to a drastic growth of the specific surface of such disperse system or aerosol, so that such drops will rapidly evaporate in the thermal decomposition—for the supply of such particles to a gaseous environment heated to a high temperature is followed by their fast evaporation, so that the carbon residue particles that were on the surface of oil drops will burn intensely, i.e. soot will burn out reducing the soot output and thus increasing the energy consumption of the process of soot production from rubber waste.

Oil atomization to drops of over 2 mm and supply of such mixture (oil drops and carbon residue particles) to the soot production reactor will result in sedimentation of drops onto the reactor walls and their coking, which will disturb the soot production process.

To prepare a mixture of oil drops and carbon residue particles where carbon residue particles are on the surface of oil drops or inside them, the carbon residue crushed to a certain extent must be used. Such crushing of the carbon residue to a size less than 0.1 mm entails significant increase of energy costs of the crushing process, and particles less than 0.1 mm in size intensely form aggregations that have to be broken prior to mixing the carbon residue with atomized oil.

The use of carbon residue with a particle size exceeding 1.0 mm will prevent forming a mixture where residue particles are on the surface of oil drops or inside the said drops, and in this case soot will intensely burn out of carbon residue particles since oil evaporation diminishes the drops, so that the carbon residue particles start to burn out, i.e. the soot burns away.

Mixing oil drops with carbon residue particles at a weight ratio of less than 0.05 kg of residue per 1 kg of oil (less than 1:0.05) and thermal decomposition of such mixture does not increase the soot output and does not ensure a uniform mixture. Due to its small quantity, the carbon residue is not uniformly spread over the mixture volume, which disturbs the soot production process.

Mixing oil drops with carbon residue particles at a weight ratio of over 3 kg of residue per 1 kg of oil will result in the carbon residue intensely absorbing oil as oil will be soaked up by carbon particles; as a result, no oil film covering residue particles will be generated, and carbon will burn out, and the soot output will decrease severely.

The gaseous products after oil release contain flammable gases that have to be disposed of to prevent their emission to the environment, therefore these gases should advisably be burnt in the soot production furnace burners, so that the use of additional fuel is not required.

The gases of thermal decomposition of oil and carbon residue contain flammable components, therefore it is advisable to burn them to obtain energy needed for thermal treatment of gaseous products of waste decomposition, so as to reduce the energy consumption of the soot production process and to prevent emissions of polluting compounds (the gases contain carbon monoxide, benzapyrene etc.) to the environment.

For those skilled in the art, the claimed invention does not clearly follow the prior art, which confirms its compliance with the "inventive level" criterion.

BRIEF DESCRIPTION OF THE FIGURES IN THE DRAWINGS

FIG. 1 shows the layout of the plant for implementation of the method of soot production from rubber waste.

The device comprises bin 1 with waste, hatcher 2 connected to bin 1, receiving bin 3 mounted on reactor 4, scale 5, motor 6 connected to screw 7, outlet 8 connected to reactor 4, fuel tank 9, burner 10, ventilator 11, heat exchanger 12 with jacket 13, flue gas duct 14, gas blower 15, temperature sensors 16 and 17, outlet 18 connected to reactor 4, distributing valve 19, pressure sensor 20, condenser 21, valve 22 connected to tank 23, burners 24 and 25 installed in soot production furnace 26, ventilator 27 with valve 28, blade batcher 29 connected to cooling drum 30, motor 31 connected to screw 32, outlet 33 connected to cooling drum 30 and magnetic separator 34, receivers 35 and 36 connected to magnetic separator 34, grinder with a set of sieves 37, receiver 38, pump 39 connected to tank 23, flowmeter 40, nozzle 41, mixing chamber 42, blower 43, double injector 44, weight feeder 45, combustion chamber 46, refrigerator 47, tank 48, pump 49, nozzle 50, cyclone 51, magnetic separator 52, receiver 53, granulator 54, drier 55, receiver 56.

According to the invention, soot is produced from rubber waste as follows.

From bin 1 via batcher 2, shredded rubber waste is fed to receiving bin 3 of reactor 4 via scale 5 at a preset mass rate. Simultaneously, screw 7 is started by motor 6 to take the waste from receiving bin 3 and to move it in reactor 4 to its outlet 8. From fuel tank 9, liquid fuel is fed to burner 10 and burnt, and the generated combustion products are pumped with ventilator 11 via shell-and-tube heat exchanger 12 and jacket 13 of reactor 4 and are removed into flue gas duct 14. Simultaneously, a gaseous medium is pumped with gas blower 15 via the tubes of heat exchanger 12 (in the beginning of the process, air is the main component of this medium) and is fed to reactor 4 towards the rubber waste moved by screw 7.

Passing via the tubes of heat exchanger 12, the gaseous medium is heated, with its heating temperature monitored by readings of temperature sensor 16. The heated gaseous medium flowing via reactor 4 yields its heat to rubber waste heating it to the preset temperature, which is monitored by readings of temperature sensor 17. Having passed reactor 4, the gaseous medium, via outlet 18 of reactor 4, enters distributing valve 19, with the aid of which the gaseous medium is fed to the tubes of heat exchanger 12.

Thus, the gaseous medium is pumped in the circuit "heat exchanger 12-reactor 4" until pyrolysis gases begin to release from the rubber waste.

The heat required for the heating and pyrolysis of the rubber waste is transferred to it both from the heated reactor walls and due to heat exchange with the gaseous medium pumped through reactor 4. As this takes place, the reactor walls are heated due to the pumping of products of fuel combustion in burner 10 via jacket 13.

Moving in reactor 4 by the action of screw 7, the waste is heated, and when a certain temperature is reached depending on the type of rubber waste), its thermal decomposition (pyrolysis) begins, releasing gaseous products and producing a carbon residue.

As a result of release of gaseous products entering the gaseous medium circulating in the circuit "heat exchanger 12-reactor 4," the pressure in the reactor rises, which is monitored by readings of pressure sensor 20. When a certain excessive pressure is reached, for instance 1 atm, some of the gaseous products mixed with the gaseous medium are extracted with distributing valve 19 to condenser 21 and cooled by heat exchange with water pumped through the condenser; as a result, oil is released in condenser 21.

The amount of gaseous products extracted from heat exchanger 12 to condenser 21 and returned to reactor 4 is adjusted with distributing valve 19 so that the pressure in reactor 4 would not drop below the atmospheric value (in this case, air leak into the reactor from the environment and ignition are possible, which may stop the process), and would not exceed 1 atm, since for higher pressures, a reactor with stronger walls will have to be used, which will eventually increase the metal consumption for the whole plant.

The gaseous products passing via the heat exchanger tubes are heated to a temperature of 1200-1300° C., resulting in thermal decomposition of high molecular weight compounds, and the molecular weight of these products decreases. Next, passing via reactor 4, the gaseous products yield their heat to the rubber waste and get cooled. Thus, extraction of the gaseous products heated to a high temperature to condenser 21 is prevented, the heat of the gaseous products is used effectively (for waste heating and pyrolysis), and the flow rate of cooling water pumped via condenser 21 is reduced. All this reduces energy costs of the process of soot production from waste.

The oil released from gaseous products is drained from condenser 21 via valve 22 to tank 23, after which the gaseous products are fed to burners 24 and 25 of soot production furnace 26 and burnt. For this purpose, air supply to burners 24 and 25 is adjusted with ventilator 27 and valve 28 is adjusted to ensure complete combustion of the gaseous products.

The generated carbon residue is continuously extracted from reactor 4 via outlet 8 and fed to blade batcher 29, which discharges the residue to cooling drum 30. Simultaneous with feeding the carbon residue to cooling drum 30, screw 32 is started with motor 31 to move the carbon residue in the drum towards its outlet 33. As this takes place, cooling water is pumped via the drum jacket. Traveling in drum 30, the carbon residue is cooled in the heat exchange with the drum's cold walls and simultaneously crushed by the action of screw 32, so that metal cord is split from carbon residue, which is needed for subsequent separation of metal cord from the carbon residue.

From the cooling drum, via outlet 33, the carbon residue and metal cord are continuously fed to magnetic separator 34, where metal is separated from the carbon residue and fed to receiver and the carbon residue is fed to receiver 36. From receiver 36, the carbon residue is fed to grinder 37 with a set of sieves and crushed; with the aid of the sieves, a fraction with particles of 0.1-1.0 mm in diameter is separated and fed to receiver 38, and the residual coarse fraction is returned to grinder 37 for additional crushing.

From oil tank 23, oil is fed with pump 39 at a preset rate (monitored by readings of flowmeter 40) to nozzle 41 and atomized in mixing chamber 42 of soot production furnace 26 to drop sizes of 0.2-2.0 mm Simultaneously, carbon residue particles are injected from receiver 38 with blower 43 via double injector 44 with a preset mass rate (monitored by readings of weight feeder 45) to the atomized oil flow in mixing chamber 42 of soot production furnace 26.

From mixing chamber 42, the generated mixture of oil and carbon residue particles enters the vortex flame jet formed in the combustion of gaseous products in burners 24 and 25 installed tangentially in mixing chamber 46.

The flow of combustion products and the soot generated as a result of thermal decomposition of oil and released from the carbon residue is extracted from furnace 26 to refrigerator 47, where water from tank 48 is atomized with pump 49 via nozzle 50; as a result, the temperature of the combustion products and soot decreases. The cooled mixture is fed from refrigerator 47 to cyclone 51 where soot and ash particles are released from the gas flow and fed to magnetic separator 52 where the soot and magnetic impurities (ashes) are divided. The ashes are fed from magnetic separator 52 to receiver 53, and the soot is fed to granulator 54 and granulated, after which the granules are fed to drier 55, dried, and discharged into receiver 56.

The gases cleaned of soot and ashes in cyclone 51 are fed to burner 10 and burnt, and the heat is used for thermal treatment of the gaseous products, which reduces the process energy consumption and prevents emission of polluting compounds (burnt in burner 10) to the atmosphere.

DETAILED DESCRIPTION OF THE PREFERRED EMBODIMENTS

The invention is illustrated in the following examples.

Example 1

From bin 1 via batcher 2, shredded rubber waste is continuously fed to receiving bin 3 of reactor 4 via scale 5 at the mass rate of 500 kg/h. Simultaneously, screw 7 is started by motor 6 to take the waste from receiving bin 3 and to move it in reactor 4 to its outlet 8. From fuel tank 9, liquid fuel is fed to burner 10 at the rate of 35 kg/h and burnt, and the generated combustion products in the amount of 420 kg/h are pumped with ventilator 11 via shell-and-tube heat exchanger 12 and jacket 13 of reactor 4 and are removed into flue gas duct 14. Simultaneously, a gaseous medium is pumped with gas blower 15 via the tubes of heat exchanger 12 (in the beginning of the process, air is the main component of this medium) and is fed to reactor 4 towards the rubber waste moved by screw 7. Passing the tubes of heat exchanger 12, the gaseous medium is heated to the temperature of 1200° C., which is monitored by readings of temperature sensor 16. The heated gaseous medium flowing via reactor 4 yields its heat to rubber waste heating it, which is monitored by readings of temperature sensor 17. The waste heating temperature varies over the reactor length. At the reactor inlet, the waste has a temperature close to the ambient temperature, and at the reactor outlet, the waste temperature rises (monitored by readings of the temperature sensor). Therefore, at the preset waste flow rate, the flow rate of the gaseous medium pumped through the reactor is changed with the gas blower so (by decreasing or increasing the flow rate) that the waste temperature at the reactor outlet would not exceed 400° C. In our case, at the given temperature (depending on the type of waste) the main bulk of gaseous products is released from the waste.

Having passed reactor 4, the gaseous medium, via outlet 18 of reactor 4, enters distributing valve 19, with the aid of which the gaseous medium is fed to the tubes of heat exchanger 12.

Thus, the gaseous medium is pumped in the circuit "heat exchanger 12-reactor 4" until the release of pyrolysis gases from the rubber waste begins.

The heat required for the heating and pyrolysis of the rubber waste is transferred to it both from the heated reactor walls and due to heat exchange with the gaseous medium pumped through reactor 4. As this takes place, the reactor walls are heated due to the pumping of products of fuel combustion in burner 10 via jacket 13.

The heat required for thermal decomposition of 500 kg of worn tires is calculated as follows:

$$Q\text{tot} = Q\text{heat} + Q\text{dec} + Q\text{loss},$$

$$Q\text{tot} = 1.2\{(Av \text{ waste } Mw(T2-T1) + qMw)\},$$

$$Q\text{tot} = 1.2\{(1.4 \text{ kJ/kg}° \text{ C. } 500 \text{ kg}(400° \text{ C.} - 20° \text{ C.}) + 600 \text{ kJ/kg } 500 \text{ kg})\} = 679,200 \text{ kJ},$$

where Q tot=total heat quantity required for thermal decomposition of the waste; Qheat=heat of waste heating up to the temperature of 400° C.; Q dec=heat consumed for waste decomposition; Qloss=heat losses making 20% of the total heat; q=specific heat of decomposition making 600 kJ/kg for rubber waste; Mw=500 kg=weight of the waste; T1=20° C. and T2=400° C.=initial and finale temperature of the waste; Av waste=specific heat of the waste equal to 1.4 kJ/kg° C.

The combustion of 35 kg/h of fuel in burner 8 releases an amount of heat equal to 35 kg/h 40,000 kJ/kg=1,400,000 kJ/h. Assume the efficiency of heat exchanger 12 is 40% in this case, i.e. the gaseous medium flowing via the tubes of heat exchanger 12 receives the following amount of heat: 1,400,000 kJ/h·0.4=560,000 kJ/h.

A part of the heat released in the fuel combustion in burner 10 is transferred with the flow of flue gases passing via jacket 13 of reactor 4 to the reactor walls, and next from the reactor walls to the rubber waste. Assume that in our case, 16.51% of the heat is transferred to the reactor walls, i.e. 1,400,000 kJ/h·0.1651=231,200 kJ/h. Thus, the waste is heated both due to direct heat transfer when the heated gaseous medium flows via reactor 4 and by heat exchange from the heated walls of reactor 4. Assume that in our case the gaseous medium conveys 80% of the heat to the waste, i.e. 560,000 kJ/h·0.8=448,000 kJ/h. The total amount of heat conveyed to the rubber waste will be 448,000 kJ/h+231,200 kJ/h=679,200 kJ/h. Thus, the waste will receive the heat amount required for their heating and thermal decomposition (pyrolysis) in one hour.

Moving in reactor 4 by the action of screw 7, the waste is heated, and when a certain temperature is reached (depending on the type of rubber waste), its thermal decomposition (pyrolysis) begins, releasing gaseous products and producing a carbon residue.

Assume that in our case the rubber waste thermal decomposition releases 40% wt of gaseous products and generates 60% wt of carbon residue containing 10% wt of metal cord, 10% wt of ashes and 10% wt of volatile hydrocarbons. Thus, in our case, decomposition of the waste will yield 500 kg·0.4=200 kg of gaseous products and 300 kg of carbon residue containing 30 kg of metal cord and 30 kg of ashes and 30 kg of volatile hydrocarbons.

As a result of release of gaseous products entering the gaseous medium circulating in the circuit "heat exchanger 12-reactor 4," the pressure in the reactor rises, which is monitored by readings of pressure sensor 20.

Gaseous products passing via the tubes of the heat exchanger are heated to the temperature of 1200° C. resulting in thermal decomposition of high molecular weight compounds, and the molecular weight of these products is reduced. Next, passing via reactor 4, the gaseous products yield their heat to rubber waste and are cooled. Thus, extraction of gaseous products heated to a high temperature to condenser 21 is prevented, the heat of gaseous products is effectively used (for waste heating and pyrolysis) and the flow rate of the cooling water pumped through condenser 21 is reduced. All this results in lower energy consumption for the process of soot production from waste.

When a certain excessive pressure has been reached, for instance 1 atm, the gaseous products at the rate of 200 kg/h are continuously extracted with distributing valve 19 to condenser 21 and cooled by heat exchange with water pumped through the condenser; as a result, oil is separated in condenser 21.

In our case, 160 kg/h of oil is released from gaseous products. The oil released from the gaseous products is drained from condenser 21 via valve 22 to tank 23 at the rate of 160 kg/h, after which the gaseous products are fed to burners 24 and 25 of soot production furnace 26 at the rate of 40 kg/h and burnt. For this purpose, air is supplied to burners 24 and 25 at the rate of 400 kg/h with ventilator 27 and valve 28, which ensures complete combustion of the gaseous products producing 440 kg/h of combustion products.

The generated carbon residue at the rate of 300 kg/h is continuously extracted from reactor 4 via outlet 8 and fed to blade batcher 29, which discharges the residue to cooling drum 30. Simultaneous with the supply of the carbon residue to cooling drum 30 screw 32 is started with motor 31 to move the carbon residue in the drum towards its outlet 33. As this takes place, cooling water is pumped via the drum jacket. Traveling in drum 30, the carbon residue is cooled in the heat exchange with the drum's cold walls and simultaneously crushed by the action of screw 32; as a result, metal cord splits from carbon residue, which is needed for subsequent separation of metal cord from the carbon residue.

From outlet 33 of the cooling drum, carbon residue and metal cord are continuously, at the rate of 300 kg/h, fed to magnetic separator 34 where metal at the rate of 30 kg/h is separated from carbon residue and fed to receiver 35, and the carbon residue at the rate of 270 kg/h is fed to receiver 36. From receiver 36, the carbon residue is fed to grinder 37 with a set of sieves and crushed; with the aid of the sieves, a fraction with particles of 0.1 mm in diameter is separated and fed to receiver 38, and the residual coarse fraction is returned to grinder 37 for additional crushing.

From oil tank 23 oil is fed with pump 39 at the rate of 160 kg/h (monitored by readings of flowmeter 40) to nozzle 41 and atomized in mixing chamber 42 of soot production furnace 26 to drop sizes of 0.2 mm Simultaneously, carbon residue particles (particle size: 0.1 mm) are injected from receiver 38 with blower 43 via double injector 44 with a preset mass flow of 8 kg/h (monitored by readings of weight feeder 45) to the atomized oil flow in mixing chamber 42 of soot production furnace 26. Thus, the weight ratio of oil and carbon residue is established as 160 kg:8 kg=1:0.05.

From mixing chamber 42, the generated mixture of oil and carbon residue particles at the rate of 168 kg/h enters the vortex flame jet formed in the combustion of gaseous products in burners 24 and 25 installed tangentially in mixing chamber 46.

In our case, some of the oil is burnt (20% of the oil's weight, i.e. 160 kg/h·0.2=32 kg/h), some is thermally decomposed producing soot (40% of the oil's weight, i.e. 160 kg/h·0.4=64 kg/h), and some is thermally decomposed producing flammable gases (40% of the oil's weight, i.e. 160 kg/h·0.4=64 kg/h). The specific heat of these gases is 20 MJ/kg.

The carbon residue is heated in the vortex flame jet and partially burns away (10% of the residue weight, i.e. 8 kg/h·0.1=0.8 kg/h). By heating to a high temperature (over 1000° C.), volatiles are removed from the carbon residue in the amount of 10% wt, i.e. 0.8 kg/h, which are subjected to thermal decomposition producing soot and gases. Assume that in our case 15% wt of soot (0.12 kg/h) and 85% wt of gases (0.68 kg/h) are produced from the volatiles.

Thus, 0.8 kg/h of volatile products is released from the carbon residue, 0.8 kg/h of carbon residue is burnt, the aggregations are broken with separation of ashes in the amount of 10% wt (i.e. 0.8 kg/h), and the soot that was used in the rubber manufacturing is released, i.e. soot at the rate of 8 kg/h−0.8 kg/h−0.8 kg/h−0.8 kg/h=5.6 kg/h is released from the carbon residue.

Generated in furnace 26 are gases in the amount of 440 kg/h+384 kg/h+64 kg/h+8 kg/h+0.68 kg/h=896.68 kg/h. In this balance, 440 kg/h are combustion products of gaseous products after oil separation, 384 kg/h—combustion products of 32 kg/h of oil, 64 kg/h—flammable gases generated in the thermal decomposition of oil, 8 kg/h—combustion products of 0.8 kg of carbon residue, and 0.68 kg/h—flammable gases generated in the thermal decomposition of volatile hydrocarbons.

The flow of combustion products and soot at the rate of 896.68 kg/h+69.6 kg/h+0.12=966.4 kg/h are extracted from furnace 26 to refrigerator 47 where water from tank 48 is atomized at the rate of 300 kg/h with pump 49 via nozzle 50; as a result, the temperature of the combustion products and soot decreases. The cooled mixture from refrigerator 47 is fed to cyclone 51 where soot and ash particles are released from the gas flow and fed to magnetic separator 52 where soot and ashes are separated. The magnetic separator separates 50% vol of ashes, i.e. 0.4 kg/h, and the rest of the ashes remains in the soot. Soot is released at the rate of 64 kg/h+5.6 kg/h+0.12 kg/h+0.4 kg/h=70.12 kg/h. The ashes from magnetic separator 52 in the amount of 0.4 kg/h is fed to receiver 53, and the soot is fed to granulator 54 and granulated, after which the granules are fed to drier 55, dried, and discharged into receiver 56.

The ash content in the soot will be (0.4 kg/70.12 kg) 100%=0.57%, which is much lower than in the soot produced by the methods of the family patents and prototype (up to 14% wt).

The gases cleaned of soot and ashes in cyclone 51 contain flammable components. These gases at the rate of 966.4 kg/h+300 kg/h−70.12 kg/h=1196.28 kg/h are fed to burner 10 and burnt. The specific heat of these gases is 1,100 kJ/kg.

The gases cleaned of soot and ashes in cyclone 51 contain flammable components, therefore they are fed to burner 10 and burnt, and the heat is used for thermal treatment of the gaseous products, which reduces the process energy consumption and prevents emission of polluting compounds (burnt in burner 10) to the atmosphere.

The combustion of the thermal decomposition gases is equivalent to the combustion of 32 kg of liquid fuel with the specific heat of 40 MJ/kg. This enables a reduction of liquid fuel supply to burner 10 from 35 kg/h to 3 kg/h, which reduces the process energy consumption and prevents emission of polluting compounds (burnt in burner 10) to the atmosphere.

Example 2

From bin 1 via batcher 2, shredded rubber waste is continuously fed to receiving bin 3 of reactor 4 via scale 5 with the mass ratio of 1000 kg/h. Simultaneously, screw 7 is started by motor 6 to take the waste from receiving bin 3 and to move it in reactor 4 to its outlet 8. From fuel tank 9, liquid fuel is fed to burner 10 at the rate of 70 kg/h and burnt, and the generated combustion products in the amount of 840 kg/h are pumped with ventilator 11 via shell-and-tube heat exchanger 12 and jacket 13 of reactor 4 and are removed into flue gas duct 14. Simultaneously, a gaseous medium is pumped with gas blower 15 via the tubes of heat exchanger 12 (in the beginning of the process, air is the main component of this medium) and is fed to reactor 4 towards the rubber waste moved by screw 7.

Passing the tubes of heat exchanger 12, the gaseous medium is heated to the temperature of 1300° C., which is monitored by readings of temperature sensor 16. The heated gaseous medium flowing via reactor 4 yields its heat to rubber waste heating it, which is monitored by readings of temperature sensor 17. The waste heating temperature varies over the reactor length. At the reactor inlet, the waste has a temperature close to the ambient temperature, and at the reactor outlet, the waste temperature rises (monitored by readings of the temperature sensor). Therefore, at the preset waste flow rate, the flow rate of the gaseous medium pumped through the reactor is changed with the gas blower so (by decreasing or increasing the flow rate) that the waste temperature at the reactor outlet would not exceed 400° C. In our case, at the given temperature (depending on the type of waste) the main bulk of gaseous products is released from the waste.

Having passed reactor 4, the gaseous medium, via outlet 18 of reactor 4, enters distributing valve 19, with the aid of which the gaseous medium is fed to the tubes of heat exchanger 12.

Thus, the gaseous medium is pumped in the circuit "heat exchanger 12-reactor 4" until the extraction of pyrolysis gases from the rubber waste begins.

The heat required for the heating and pyrolysis of the rubber waste is transferred to it both from the heated reactor walls and due to heat exchange with the gaseous medium pumped through reactor 4. As this takes place, the reactor walls are heated due to the pumping of products of fuel combustion in burner 10 via jacket 13.

The heat required for thermal decomposition of 1000 kg of worn tires is 1,358,000 kJ.

The combustion of 70 kg/h of fuel in burner 8 releases an amount of heat equal to 70 kg/h·40,000 kJ/kg=2,800,000 kJ/h. Assume the efficiency of heat exchanger 12 is 40% in this case, i.e. the gaseous medium flowing via the tubes of heat exchanger 12 receives the following amount of heat: 2,800,000 kJ/h·0.4=1,120,000 kJ/h.

A part of the heat released in the fuel combustion in burner 10 is transferred with the flow of flue gases passing via jacket 13 of reactor 4 to the reactor walls, and next from the reactor walls to the rubber waste Assume that in our case, 16.51% of the heat is transferred to the reactor walls, i.e. 2,800,000 kJ/h·0.165=462,000 kJ/h. Thus, the waste is heated both due to direct heat transfer when the heated gaseous medium flows via reactor 4 and by heat exchange from the heated walls of reactor 4. Assume that in our case the gaseous medium conveys 80% of the heat to the waste, i.e. 1,120,000 kJ/h·0.8=896,000 kJ/h. The total amount of heat conveyed to the rubber waste will be 896,000 kJ/h+462,000 kJ/h=1,358,000 kJ/h. Thus, the amount of heated required for the waste heating and thermal decomposition (pyrolysis) will be transferred to it in one hour.

Moving in reactor 4 by the action of screw 7, the waste is heated, and when a certain temperature is reached (depending on the type of rubber waste), its thermal decomposition (pyrolysis) begins, releasing gaseous products and producing a carbon residue.

Assume that in our case the rubber waste thermal decomposition releases 40% wt of gaseous products and generates 60% wt of carbon residue containing 10% wt of metal cord, 10% wt of ashes and 10% wt of volatile hydrocarbons. Thus, in our case, decomposition of the waste will yield 1000 kg·0.4=400 kg of gaseous products and 600 kg of carbon residue containing 60 kg of metal cord and 60 kg of ashes and 60 kg of volatile hydrocarbons.

As a result of extraction of gaseous products received by the gaseous medium circulating in the circuit "heat exchanger 12-reactor 4", the pressure in the reactor rises, which is monitored by readings of pressure sensor 20.

Gaseous products passing via the tubes of the heat exchanger are heated to the temperature of 1300° C. resulting in thermal decomposition of high molecular weight compounds, and the molecular weight of these products is reduced. Next, passing through reactor 4, the gaseous products yield their heat to rubber waste and are cooled. Thus, extraction of gaseous products heated to a high temperature to condenser 21 is prevented, the heat of gaseous products is effectively used (for waste heating and pyrolysis) and the flow rate of the cooling water pumped through condenser 21 is reduced. All this results in lower energy consumption for the process of soot production from waste.

When a certain excessive pressure has been reached, for instance 1 atm, the gaseous products at the rate of 400 kg/h are continuously extracted with distributing valve 19 to condenser 21 and cooled by heat exchange with water pumped through the condenser, as a result, oil is released in condenser 21.

In our case, 320 kg/h of oil is released from gaseous products. The oil released from the gaseous products is drained from condenser 21 via valve 22 to tank 23 at the rate of 320 kg/h, after which the gaseous products are fed to burners 24 and 25 of soot production furnace 26 at the rate of 80 kg/h and burnt. For this purpose, air is supplied to burners 24 and 25 at the rate of 800 kg/h with ventilator 27 and valve 28, which ensures complete combustion of the gaseous products producing 880 kg/h of combustion products.

The generated carbon residue at the rate of 600 kg/h is continuously extracted from reactor 4 via outlet 8 and fed to blade batcher 29, which discharges the residue to cooling drum 30. Simultaneous with feeding the carbon residue to cooling drum 30, screw 32 is started with motor 31 to move the carbon residue in the drum towards its outlet 33. As this takes place, cooling water is pumped via the drum jacket. Traveling in drum 30, the carbon residue is cooled in the heat exchange with the drum's cold walls and simultaneously crushed by the action of screw 32; as a result, metal cord splits from carbon residue, which is needed for subsequent separation of metal cord from the carbon residue.

From the cooling drum, via outlet 33, the carbon residue and metal cord are continuously fed to magnetic separator 34 at the rate of 600 kg/h, where metal in the amount of 60 kg/h is separated from the carbon residue and fed to receiver 35 and the carbon residue is fed to receiver 36 at the rate of 540 kg/h. From receiver 36, the carbon residue is fed to grinder 37 with a set of sieves and crushed, and with the said sieves, a fraction with particles of 1.0 mm in diameter is separated and fed to receiver 38, and the residual coarse fraction is returned to grinder 37 for additional crushing.

From oil tank 23, oil is fed with pump 39 at the rate of 160 kg/h (monitored by readings of flowmeter 40) to nozzle 41 and atomized in mixing chamber 42 of soot production furnace 26 to drop sizes of 2.0 mm Simultaneously, carbon residue particles (particle size: 1.0 mm) are injected from receiver 38 with blower 43 via double injector 44 with a preset mass flow of 480 kg/h (monitored by readings of weight feeder 45) to the atomized oil flow in mixing chamber 42 of soot production furnace 26. Thus, the weight ratio of oil and carbon residue is established as 160 kg:480 kg=1:3.

From mixing chamber 42, the generated mixture of oil and carbon residue particles enters at the rate of 640 kg/h the vortex flame jet formed in the combustion of gaseous products in burners 24 and 25 installed tangentially in mixing chamber 46.

In our case, some of the oil burns (20% of the oil weight, i.e. 160 kg/h·0.2=32 kg/h), some is thermally decomposed producing soot (40% of the oil weight, i.e. 160 kg/h·0.4=64 kg/h), and some is thermally decomposed producing flammable gases (40% of the oil weight, i.e. 160 kg/h·0.4=64 kg/h). The specific heat of these gases is 20 MJ/kg.

The carbon residue is heated in the vortex flame jet and partially burns away (10% of the residue weight, i.e. 480 kg/h·0.1=48 kg/h). As a result of heating to a high temperature (over 1000° C.), volatiles in the amount of 10% of the weight, i.e. 48 kg/h, are removed from the carbon residue, which are thermally decomposed producing soot and gases. Assume that in our case 15% wt of soot (7.2 kg/h) and 85% wt of gases (40.8 kg/h) are generated from the volatiles.

Thus, 48 kg/h of volatile products is released from the carbon residue, 48 kg/h of the carbon residue is burnt, the aggregations are broken, ashes in the amount of 10% wt (i.e. 48 kg/h) are separated, and the soot that was used in the rubber manufacturing is released, i.e. soot in the amount of 480 kg/h−48 kg/h−48 kg/h−48 kg/h=336 kg/h is released from the carbon residue.

Furnace 26 generates gases in the amount of 880 kg/h+384 kg/h+64 kg/h+480 kg/h+40.8 kg/h=1848.8 kg/h. In this balance, 880 kg/h are products of combustion of gaseous products after oil separation, 384 kg/h=combustion products of 32 kg/h of oil, 64 kg/h=flammable gases generated in the thermal decomposition of oil, 480 kg/h=combustion products of the carbon residue, and 40.8 kg/h=flammable gases generated in the thermal decomposition of the volatiles.

The flow of combustion products and soot at the rate of 1848.8 kg/h+336 kg+7.2 kg/h+64 kg/h=2256 kg/h is extracted from furnace 26 to refrigerator 47 where water from tank 48 is atomized at the rate of 600 kg/h with pump 49 via nozzle 50; as a result, the temperature of the combustion products and soot decreases. The cooled mixture from refrigerator 47 is fed to cyclone 51 where soot and ash particles are released from the gas flow and fed to magnetic separator 52 where soot and ashes are separated. The magnetic separator separates 50% vol of ashes, and the rest of the ashes is in the soot as non-magnetic impurities. Soot is released at the rate of 336 kg/h+64 kg/h+7.2 kg/h+24 kg/h=431.2 kg/h. The ashes from magnetic separator 52 in the amount of 24 kg/h is fed to receiver 53, and the soot is fed to granulator 54 and granulated, after which the granules are fed to drier 55, dried, and discharged into receiver 56.

The gases cleaned of soot and ashes in cyclone 51 at the rate of 1848.8 kg/h+600 kg/h−431.2 kg/h=2017.6 kg/h are fed to burner 10 and burnt, and the heat is used for thermal treatment of the gaseous products, which reduces the process energy consumption and prevents emission of polluting compounds (burnt in burner 10) to the atmosphere.

The combustion of the thermal decomposition gases (the calorific value of these gases is 1050 kJ/kg) is equivalent to the combustion of 56 kg of liquid fuel with the specific heat of 40 MJ/kg. This enables a reduction of liquid fuel supply to burner 10 from 70 kg/h to 14 kg/h, which reduces the process energy consumption and prevents emission of polluting compounds (burnt in burner 10) to the atmosphere.

INDUSTRIAL APPLICABILITY

The claimed method of production of soot from rubber waste differs from the prior art in improved performances of energy consumption, emissions to the environment, and product quality, confirming its compliance with the "industrial applicability" criterion.

What is claimed is:

1. A method of producing soot from scrap rubber, the method comprising:
   thermally decomposing the scrap rubber into carbon residue and gaseous components;
   heating the gaseous components to 1200-1300° C.;
   separating the gaseous components into oils and gaseous waste;
   atomizing the oils to a diameter range in 0.2-2.0 mm oil droplets;
   grinding the carbon residue to a diameter range in 0.1-1.0 mm particles;
   thermally decomposing a 1:(0.05-3), by weight, mixture of the oil droplets and the particles into soot, ashes and by-product gases;
   separating the soot from the ashes using an electromagnetic separation process; and
   burning the by-product gases and the gaseous waste to produce thermal energy.

* * * * *